United States Patent
Wolff et al.

(10) Patent No.: US 10,632,980 B2
(45) Date of Patent: Apr. 28, 2020

(54) METHOD FOR RELEASING A FIRST BRAKE DEVICE WHICH IS ACTUATED BY ELECTRIC MOTOR, CONTROL UNIT FOR A BRAKE SYSTEM OF A VEHICLE, BRAKE SYSTEM FOR A VEHICLE, AND VEHICLE HAVING A BRAKE SYSTEM OF THIS TYPE

(71) Applicant: Robert Bosch GmbH, Stuttgart (DE)

(72) Inventors: Helmut Wolff, Untergruppenbach (DE); Andreas Englert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/776,003

(22) PCT Filed: Nov. 7, 2016

(86) PCT No.: PCT/EP2016/076848
§ 371 (c)(1),
(2) Date: May 14, 2018

(87) PCT Pub. No.: WO2017/102176
PCT Pub. Date: Jun. 22, 2017

(65) Prior Publication Data
US 2018/0326961 A1 Nov. 15, 2018

(30) Foreign Application Priority Data
Dec. 14, 2015 (DE) .......... 10 2015 225 041

(51) Int. Cl.
*B60T 13/66* (2006.01)
*B60T 13/58* (2006.01)
(Continued)

(52) U.S. Cl.
CPC .......... *B60T 13/662* (2013.01); *B60T 13/588* (2013.01); *B60T 13/741* (2013.01); *F16D 55/226* (2013.01)

(58) Field of Classification Search
CPC ...... B60T 7/045; B60T 13/588; B60T 13/662; B60T 13/741; B60T 2201/06; F16D 55/226
See application file for complete search history.

(56) References Cited

U.S. PATENT DOCUMENTS 7,431,133 B2 * 10/2008 Maron .................... B60T 7/045
188/158
7,744,166 B2 * 6/2010 Leiter ..................... B60T 7/107
188/106 P
(Continued)

FOREIGN PATENT DOCUMENTS

DE 10 2005 030 621 A1 4/2006
DE 10 2005 014 242 A1 10/2006
(Continued)

OTHER PUBLICATIONS

International Search Report corresponding to PCT Application No. PCT/EP2016/076848, dated Feb. 16, 2017 (German and English language document) (5 pages).

*Primary Examiner* — Thomas W Irvin
(74) *Attorney, Agent, or Firm* — Maginot, Moore & Beck LLP

(57) ABSTRACT

A method for releasing a first electric motor-actuated brake device for a vehicle includes actuating a second brake device for the vehicle in a clamping direction with a first brake device in a clamped state in order to produce a predetermined clamping force on a brake piston that is associated with the first brake device and the second brake device in common. The method further includes actuating the first
(Continued)

brake device in a release direction before the second brake device reaches the predetermined clamping force.

13 Claims, 2 Drawing Sheets

(51) Int. Cl.
    *B60T 13/74*     (2006.01)
    *F16D 55/226*     (2006.01)

(56) References Cited

U.S. PATENT DOCUMENTS

| | | | |
|---|---|---|---|
| 8,322,495 B2* | 12/2012 | Leiter | B60T 7/107 |
| | | | 188/72.6 |
| 8,511,439 B2* | 8/2013 | Baumgartner | B60T 13/741 |
| | | | 188/72.2 |
| 9,260,094 B2* | 2/2016 | Yuasa | B60T 13/662 |
| 9,340,192 B2* | 5/2016 | Schwarz | B60T 7/042 |
| 10,166,960 B2* | 1/2019 | Poertzgen | B60T 7/042 |
| 2006/0186731 A1* | 8/2006 | Bach | B60T 7/104 |
| | | | 303/89 |

FOREIGN PATENT DOCUMENTS

| | | |
|---|---|---|
| EP | 1 621 438 A2 | 2/2006 |
| JP | 2010-52643 A | 3/2010 |
| WO | 2004/022394 A1 | 3/2004 |
| WO | 2005/073043 A1 | 8/2005 |

\* cited by examiner

METHOD FOR RELEASING A FIRST BRAKE DEVICE WHICH IS ACTUATED BY ELECTRIC MOTOR, CONTROL UNIT FOR A BRAKE SYSTEM OF A VEHICLE, BRAKE SYSTEM FOR A VEHICLE, AND VEHICLE HAVING A BRAKE SYSTEM OF THIS TYPE

This application is a 35 U.S.C. § 371 National Stage Application of PCT/EP2016/076848, filed on Nov. 7, 2016, which claims the benefit of priority to Serial No. DE 10 2015 225 041.5, filed on Dec. 14, 2015 in Germany, the disclosures of which are incorporated herein by reference in their entirety.

The disclosure concerns a method for releasing an electric motor-actuated brake device, a control unit for a brake system of a vehicle, a brake system for a vehicle with a control unit of this type, and a vehicle with a brake system of this type.

BACKGROUND

In the case of an electric motor-actuated brake device, a clamping force is preferably produced by means of a spindle-nut system, wherein the spindle-nut system is preferably disposed in a brake piston. Because of the electromechanical actuation and the design-related mechanical transmission by means of gear stages, a brake device of this type has longer application times for clamping and release processes, in particular compared to purely hydraulic brake devices. In this case, in particular occur it can that the time to build up a clamping force is in conflict with a rapid start-up demand by a driver of a vehicle. As an example, in order to show the potential of said method, a so-called racing start can be considered that is to be carried out from a standstill, starting from a state with a clamped electric motor-actuated parking brake device. The parking brake must then be actuated in the release direction before the vehicle can pick up speed. In particular, in the case of powerful vehicles, or in the case of electrically powered vehicles in which the start-up torque is built up rapidly or already available with the motor at rest, the start-up torque can be available before the holding force of the parking brake has decreased.

It appears that a main reason for the comparatively slow release of an electric motor-actuated brake device is that systems of this type are designed to be self-locking and experience a high level of friction because of the clamping force, so that a build-up of the revolution rate of the electric motor takes place under comparatively high load, wherein a no-load revolution rate can only be reached relatively late. It is known from WO 2005/073043 A1 to relieve the load on a first electric motor-actuated brake device by activating a second, hydraulically actuated brake device, and thus to enable improved release of the first brake device. With a procedure of this type however, a desired hydraulic pressure is first fully built up before the electric motor-actuated brake device is actuated in the release direction. This again costs time, which delays the release process.

SUMMARY

It is the object of the disclosure to provide a method for releasing a first electric motor-actuated brake device, a control unit for a brake system, a brake system for a vehicle, and a vehicle with a brake system of this type, wherein the disadvantages mentioned do not occur. In particular, an improved, in particular faster release of the electric motor-actuated brake device shall be possible.

The object is achieved by providing the subject matter disclosed herein. Advantageous embodiments result from additional features disclosed herein.

In particular, the object is achieved by providing a method for releasing a first electric motor-actuated brake device for a vehicle, wherein with the first brake device in the clamped state, a second brake device for the vehicle is actuated in a clamping direction in order to produce a predetermined clamping force on a brake piston that is associated with both brake devices in common. The first brake device is actuated in a release direction before the second brake device reaches the predetermined clamping force. There is thus no wait until the predetermined clamping force is fully built up by the second brake device, rather parallel actuation of the first brake device and the second brake device is carried out, wherein the first brake device is actuated before the second brake device has built up the predetermined clamping force. As a result, the first brake device is relieved of load by the second brake device, which accelerates the release process, and is already actuated at a comparatively early point in time, which has an additional positive effect on the acceleration of the release process. Thus, overall very rapid releasing of the first brake device can be carried out.

In particular, a brake device means a device that is arranged to decelerate a vehicle and/or to hold it in the stationary state, so that the vehicle does not roll away—either on an upslope or a downslope.

The first brake device is preferably an automated parking brake (APB), particularly preferably an automated parking brake having electric motors that are disposed directly on wheel brakes of the vehicle, in particular on wheel brakes of a rear axle. A system of this type is typically referred to as an APB-M (motor on caliper).

A clamped state means a state of the brake device in which said device develops a braking force. In particular, the brake device can be moved between a clamped state and a released state, wherein the brake device does not develop a braking force in the released state.

A clamping direction accordingly means a direction of actuation of the brake device, in which said device is moved from the released state into the clamped state. A release direction accordingly means a direction in which the brake device is moved from the clamped state into the released state.

The brake piston is preferably associated with the first brake device and the second brake device in common, which means that both the first brake device and also the second brake device act on the same brake piston.

In particular here, a brake piston means an element that carries a brake lining and that is arranged and disposed to displace the brake lining against a brake disk. The first brake device preferably comprises a spindle-nut system that is disposed in the brake piston. The second brake device preferably acts on the brake piston in a different way, in particular hydraulically.

In particular, the second brake device is different from the first brake device. The second brake device is preferably not actuated by electric motor, but in a different way, in particular hydraulically. A service brake of a vehicle is preferably used as a second brake device, i.e. a brake device that is used to decelerate the vehicle in the normal fault-free driving mode of the vehicle.

That the first brake device is actuated before the second brake device reaches the predetermined clamping force means that the first brake device is actuated before the second brake device is actuated in the clamping direction, or that the first brake device is actuated after the second brake device is actuated in the clamping direction. In both cases, the advantages mentioned above result.

According to a development of the disclosure, however, it is provided that the first brake device and the second brake device are actuated simultaneously. This enables actuation of the brake devices that is also simple and particularly rapid. In particular, the first brake device and the second brake device are preferably actuated simultaneously. In particular, this can mean that a control unit for a brake system comprising the first brake device and the second brake device issues actuation commands to both brake devices simultaneously, in particular at the same time, or that the control unit issues said commands—if it is not configured to issue commands at the same time—in immediate succession, i.e. in particular without a specifically provided delay or dead time.

According to a development of the disclosure, it is provided that the clamping force is produced hydraulically by the second brake device. This is especially the case if the second brake device is a service brake of a vehicle that preferably comprises a hydraulic brake circuit with a brake booster for building up a hydraulic brake pressure. An electronic braking force distribution system (Electronic Stability Program ESP) can also be used as the second brake device, in particular if the same is arranged to bring about an active hydraulic pressure build-up. In addition or alternatively, it is possible that the second brake device comprises a brake booster without a vacuum, in particular an electrical or electronic brake booster.

According to a development of the disclosure, it is provided that the first brake device and the second brake device are actuated if a start-up demand by a driver of a vehicle comprising the brake devices is detected. This enables safe standing of the vehicle with the first brake device clamped until the driver's start-up demand occurs on the one hand, and at the same time a rapid start-up when the start-up demand occurs. In particular, a rapid start-up is possible in the sense of a racing start.

According to a development of the disclosure, it is provided that the driver's start-up demand is detected using a pedal position of the vehicle. In this case, it can be a gas pedal position, a brake pedal position and/or a clutch pedal position. Most particularly, a driver's start-up demand can be reliably detected using a gas pedal position.

Alternatively or additionally, the driver's start-up demand can also be detected using a gear selection, in particular using the position of a gear shift. Thus, for example a driver's start-up demand can be detected if the driver engages the first gear or an automatic gearbox is changed to the drive mode (drive-D).

According to a development of the disclosure, it is provided that the process is only carried out if a gas pedal position is detected that exceeds a predetermined gas pedal limit position towards a higher demanded torque. In this case, the predetermined limit position can in particular be selected so that the process is only carried out in the event of a racing start being demanded by the driver, in particular in the event of full depression of gas pedal, in particular a so-called kickdown. In situations of this type, the driver is demanding a particularly rapid start-up process, so that the advantages of the method are realized here in a particular way.

In addition or alternatively, it is preferably provided that the process is only carried out if a gas pedal operation by the driver is detected, the gradient against time of which—towards a steeper gradient—exceeds a predetermined gradient limit. In particular, it is thus possible to monitor a gradient of the gas pedal operation and to detect a rapid start-up demand therefrom. If the gradient against time of the gas pedal operation, i.e. in particular the rate of operation, exceeds the predetermined gradient limit, in particular a predetermined rate of operation, a rapid start-up demand can be concluded.

The object is also achieved by providing a control unit for a brake system of a vehicle that is arranged to implement one of the previously described embodiments of the method. In this case, in particular the advantages that have already been described in connection with the method are realized in connection with the control unit.

The object is also achieved by providing a brake system for a vehicle that comprises a first electric motor-actuated brake device, wherein the brake system moreover comprises a second brake device that is different from the first brake device. Moreover, the brake system comprises a control unit that is arranged to carry out a method according to any one of the previously described embodiments, or that is embodied according to any one of the previously described exemplary embodiments. In this case, in particular the advantages that have already been described in connection with the method and the control unit are realized in connection with the brake system.

The first brake system is preferably embodied as an automatic parking brake (APB). In particular, in this case preferably at least two electric motors are disposed on at least two wheel brakes, in particular on a rear axle of the vehicle, so that the first brake device is embodied as an APB-M system (motor on caliper).

The second brake device is preferably embodied as a service brake of a vehicle, in particular as a hydraulic brake device. In this case, it is possible that the second brake device is embodied as an electronic braking force distribution system, and/or comprises an electrical or electronic brake booster.

The brake system preferably comprises a pressure modulation device that is arranged to provide highly dynamic pressure. As a result, a very rapid pressure build-up can be produced, and a built-up brake pressure can also be very rapidly reduced again, which enables a particularly rapid start-up process.

In addition or alternatively, the brake system preferably comprises a force modulation device that is highly dynamic. This too enables a rapid start-up process in a particularly favorable manner.

The object is finally also achieved by providing a vehicle that comprises a brake system according to any one of the previously described exemplary embodiments.

This results in the advantages in connection with the vehicle that have already been described in connection with the method, the control unit and the brake system.

The vehicle is preferably embodied as a motor vehicle, in particular as a passenger vehicle, as a truck or as a utility vehicle.

BRIEF DESCRIPTION OF THE DRAWINGS

The disclosure is described in detail using the drawing. In the figures.

DETAILED DESCRIPTION

Figure 1:
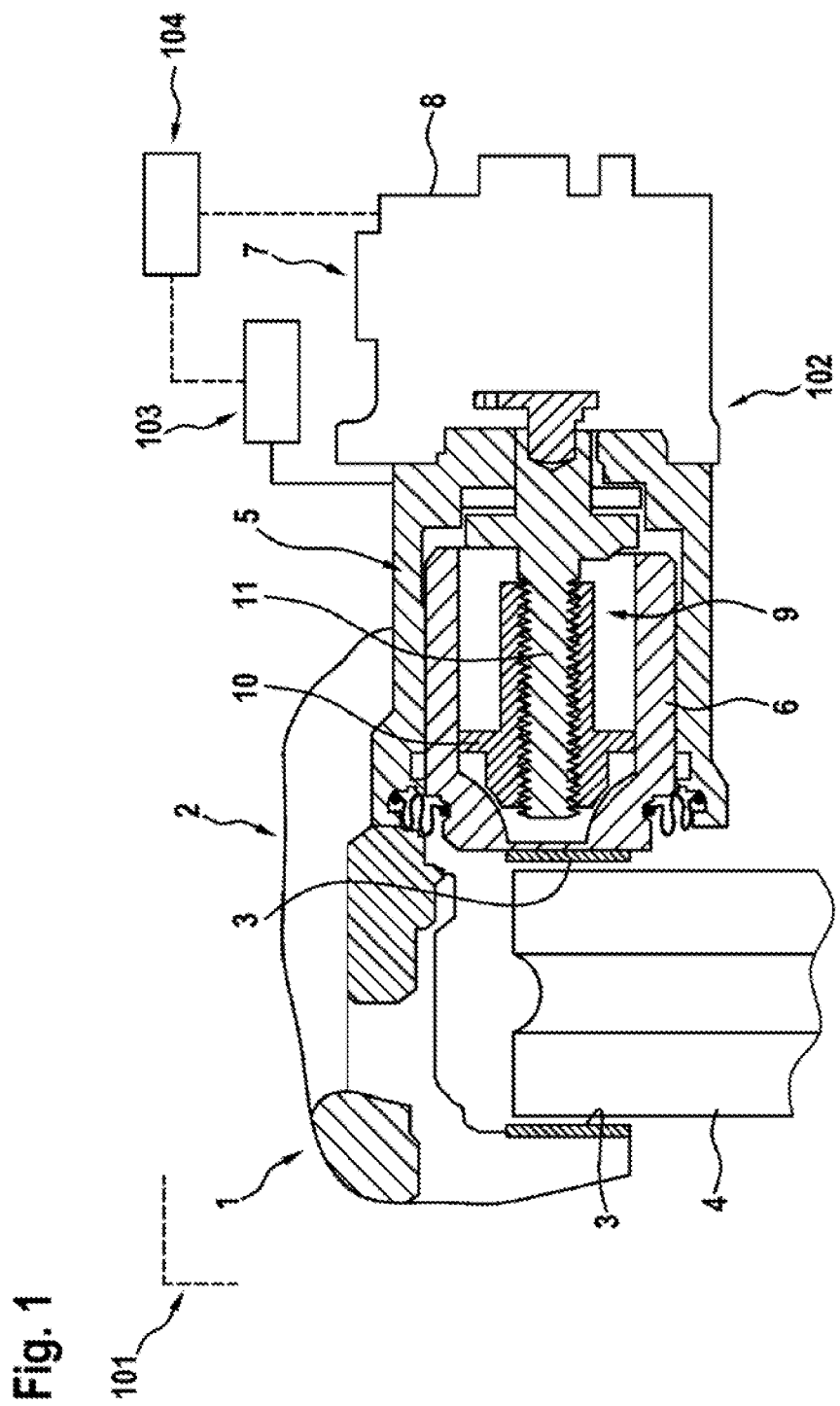
FIG. 1 shows a detailed schematic representation of an exemplary embodiment of a vehicle with a brake system.

FIG. 1 shows in a simplified sectional representation a brake system 1 of a vehicle 101 with a first electric motor-actuated brake device 102 and a second brake device 103 that is not actuated by electric motor. The brake system 1 comprises a disk brake, wherein a brake caliper 2 is provided that carries brake linings 3, between which a brake disk 4 that is joined to a wheel of the vehicle 101 can be jammed or clamped. For this purpose, a hydraulic actuator 5 is associated with the brake caliper 2 that is associated with the second brake device 103, which is embodied here as a hydraulic brake device, the actuator 5 comprising a brake piston that is hydraulically actuated to clamp the brake disk 4 between the brake linings 3 when required. As a result, in particular with the vehicle 101 in the driving mode, a braking torque is applied to the brake disk 4 and thus to the wheels, which is used to decelerate the vehicle 101.

The first brake device 102 is embodied as a parking brake, in particular as an automatic parking brake, and comprises an electromotive actuator 7 that is formed by an electric motor 8, an actuator gearbox 9, which is embodied in the present case as a spindle gear, and an actuator element 10. A driven shaft of the electric motor 8 is rotationally fixedly joined to a drive spindle 11 of the actuator gearbox 9 in this case. The drive spindle 11 comprises an external thread that works in conjunction with an internal thread of the actuator element 10, which is movable along the drive spindle 11. By actuating the electric motor 8, the drive spindle 11 is thus set into a rotational motion in order to displace the actuator element 10. In doing so the actuator element 10 can be displaced from a release position into a clamping position and back, wherein in the clamping position the actuator element 10 displaces the brake piston 6 against the brake disk 4 and as a result clamps the brake caliper 2. The brake piston 6 is therefore associated with the first brake device 102 and the second brake device 103 in common.

The actuator element 10 is disposed coaxially relative to the brake piston 6 and within the brake piston 6. The actuator gearbox 9 carries out the conversion of the rotational motion of the drive spindle 11 into a translational motion of the actuator element 10. In this respect, the wheel brake device corresponds to known wheel brake devices.

A control unit 104 is provided that is arranged to actuate the first brake device 102 and the second brake device 103.

If the first brake device 102 is clamped, a clamping force acts via the brake piston 6 on the actuator element 10 and thus at the same time on the drive spindle 11, wherein the first brake device 102 is embodied to be self-locking, so that very large clamping forces are acting. Thus, a high load torque acts on the electric motor 8 when releasing the first brake device 102, which hinders and in particular delays the start thereof.

In order to accelerate the release process, in particular a hydraulic brake pressure can be built up by means of the second brake device 103 that forces the brake piston 6 in the clamping direction and thus reduces the load on the actuator element 10. The electric motor 8 can then run up without load and can reach the no-load revolution rate thereof very rapidly, which accelerates the release process considerably.

This is possible particularly rapidly if the first brake device 102 is already actuated in the release direction before the second brake device 103 reaches a predetermined clamping force.

It is therefore preferable for releasing the first brake device 102 that the second brake device 103 is actuated in the clamping direction with the first brake device 102 in the clamped state, in order to produce a predetermined clamping force on the brake piston 6, wherein the first brake device 102 is actuated in the release direction before the second brake device 103 reaches the predetermined clamping force.

The first brake device 102 and the second brake device 103 are preferably actuated simultaneously, in particular at the same time.

The first brake device 102 and the second brake device 103 are preferably actuated if a start-up demand by the driver of the vehicle 101 is detected, wherein this can in particular be detected using a pedal position in the vehicle 101 and/or using a gear selection by the driver. It is possible that the release process described here is only carried out if a gas pedal position or operation is detected that exceeds a predetermined limit position or a predetermined gas pedal operation rate. In particular, this can be the case in the event of a so-called kickdown, i.e. a full depression of the gas pedal, in particular for performing a racing start.

Figure 2:
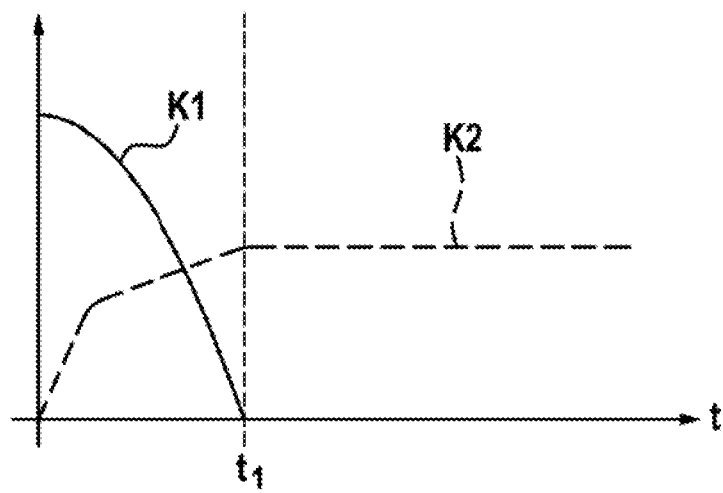
FIG. 2 shows a diagrammatic representation of a release process of an electric motor-actuated brake device without the support of a second brake device.

FIG. 2 shows a diagrammatic representation of a release process of the first brake device 102 without support from the second brake device 103. In this case, plotted against the time t are a first, solid curve K1, representing the profile of a clamping force when releasing the first brake device 102, and a second, dashed curve K2, representing the revolution rate profile of the electric motor 8 during the release process. This shows that the clamping force according to the first curve K1 is reduced only relatively slowly, wherein it is only completely reduced at a first point in time $t_1$. Accordingly, the build-up of torque of the electric motor 8—as represented by the second curve K2—is also slowed down, since the motor is running up under load, wherein a no-load revolution rate is essentially only reached at the first point in time $t_1$. As a result, the release process is considerably slowed overall.

For the following discussion, it is assumed that the actuator element 10 travels a defined distance until the clamping force has fully reduced to zero at the first point in time $t_1$.

Figure 3:
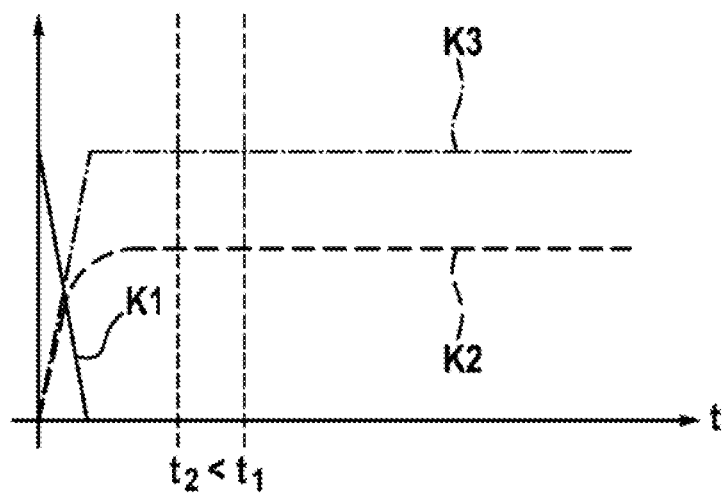
FIG. 3 shows a corresponding representation of a release process with the support of a second brake device.

In FIG. 3, a diagrammatic representation of a release process of the first brake device 102 with the support of the second brake device 103 is represented. Identical and functionally equivalent elements are provided with the same reference characters, so that in this respect reference is made to the preceding description. Here a third, dashed-dotted curve K3 is plotted against time, which represents the profile of a clamping force that is applied by the second brake device 103. In this case, it can be seen that the clamping force according to the first curve K1 that is acting to decelerate the electric motor 8 decreases to the same extent as the clamping force according to the third curve K3 that is built up by the second brake device 103. The electric motor 8 is thus increasingly relieved of load, wherein in particular this can take place very rapidly owing to the highly dynamic nature of the second brake device 103.

Moreover, the first brake device 102 and the second brake device 103 are actuated in parallel, so that owing to said effect and owing to the load reduction on the electric motor 8, the no-load revolution rate can be reached very rapidly—as is apparent when using the second curve K2.

This shows that the distance travelled under load by the actuator element 10 and represented in FIG. 2 until full release of the clamping force under no-load conditions according to FIG. 3 is already covered here at a second point in time $t_2$, wherein the second point in time $t_2$ is less than the first point in time $t_1$, which is also shown here for comparison. This shows clearly that the release process of the first brake device 102 can take place more rapidly because of the support by the second brake device 103, and in particular because of the parallel actuation of the brake devices 102, 103. In this case, preferably 25% or even more of the total release time can be saved.

Overall, it is shown that rapid release of the first brake device 102 is possible using the method, the control unit 104, the brake system 1 and the vehicle 101, wherein in particular driver's demand for a faster start-up, in particular in the form of a racing start, can be supported.

The invention claimed is:

1. A method for releasing a first electric motor-actuated brake device for a vehicle, comprising:
    actuating a second brake device for the vehicle in a clamping direction with a first brake device in a clamped state in order to produce a predetermined clamping force on a brake piston that is associated with the first brake device and the second brake device in common; and
    actuating the first brake device in a release direction before the second brake device reaches the predetermined clamping force.

2. The method as claimed in claim 1, wherein the actuating of the first brake device in the release direction occurs simultaneously with the actuating of the second brake device in the clamping direction.

3. The method as claimed in claim 1, wherein the actuation of the second brake device further comprises:
    producing the predetermined clamping force hydraulically using the second brake device.

4. The method as claimed in claim 1, further comprising:
    detecting a driver's start up demand for the vehicle,
    wherein the actuating of the first brake device in the release direction and the actuating of the second brake device in the clamping direction occur in response to the detection of the driver's start-up demand for the vehicle.

5. The method as claimed in claim 4, wherein the detecting of the driver's start-up demand includes using a clutch pedal position of the vehicle to detect the driver's start-up demand.

6. The method as claimed in claim 4, wherein the detecting of the driver's start-up demand comprises:
    using at least one of a pedal position of the vehicle and a gear selection by the driver to detect the driver's start up demand.

7. The method as claimed in claim 1, wherein the actuating of the first brake device in the release direction and the actuating of the second brake device in the clamping direction are only carried out in response to at least one of (i) detecting a gas pedal position that exceeds a predetermined gas pedal limit position and (ii) detecting a gradient of a gas pedal operation against time that exceeds a predetermined gradient limit.

8. The method as claimed in claim 1, wherein the method is executed by a control unit for a brake system of the vehicle.

9. A brake system for a vehicle, comprising:
    first electric motor-actuated brake device;
    a second brake device that is different from the first brake device;
    a brake piston associated with the first brake device and the second brake device in common; and
    a control unit operatively connected to the first brake device and to the second brake device for the actuation thereof, the control unit configured to release the first brake device from a clamped state by:
        actuating the second brake device in a clamping direction with the first brake device in the clamped state to produce a predetermined clamping force on the brake piston; and
        actuating the first brake device in a release direction before the second brake device reaches the predetermined clamping force.

10. The brake system as claimed in claim 9, wherein the first brake device is an automatic parking brake of the vehicle and the second brake device is a hydraulic service brake of the vehicle.

11. The brake system as claimed in claim 9, wherein the control unit is further configured to:
    detect a driver's start-up demand using a clutch pedal position of the vehicle;
    actuate the first brake device in the release direction and actuate the second brake device in the clamping direction in response to the detection of the driver's start-up demand for the vehicle.

12. A vehicle, comprising:
    a brake system including:
        a first electric motor-actuated brake device;
        a second brake device that is different from the first brake device;
        a brake piston associated with the first brake device and the second brake device in common; and
        a control unit operatively connected to the first brake device and to the second brake device for the actuation thereof, the control unit configured to release the first brake device from a clamped state by:
            actuating the second brake device in a clamping direction to produce a predetermined clamping force on the brake piston; and
            actuating the first brake device in a release direction before the second brake device reaches the predetermined clamping force.

13. The vehicle as claimed in claim 12, wherein the control unit is further configured to:
    detect a driver's start-up demand using a clutch pedal position of the vehicle;
    actuate the first brake device in the release direction and actuate the second brake device in the clamping direction in response to the detection of the driver's start-up demand for the vehicle.

* * * * *